United States Patent
Smiljanovski et al.

(10) Patent No.: US 9,863,307 B2
(45) Date of Patent: Jan. 9, 2018

(54) INTERNAL COMBUSTION ENGINE WITH EXHAUST-GAS TURBOCHARGING AND EXHAUST-GAS RECIRCULATION

(71) Applicant: Ford Global Technologies, LLC, Dearborn, MI (US)

(72) Inventors: Vanco Smiljanovski, Bedburg (DE); Helmut Matthias Kindl, Aachen (DE); Joerg Kemmerling, Monschau (DE); Andreas Kuske, Geulle (NL); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 14/872,461

(22) Filed: Oct. 1, 2015

(65) Prior Publication Data
US 2016/0108802 A1 Apr. 21, 2016

(30) Foreign Application Priority Data
Oct. 15, 2014 (DE) .................. 10 2014 220 905

(51) Int. Cl.
| | | |
|---|---|---|
| F02B 37/16 | (2006.01) |
| F02B 39/16 | (2006.01) |
| F02M 26/05 | (2016.01) |
| F02M 26/06 | (2016.01) |
| F02M 26/09 | (2016.01) |
| F04D 29/68 | (2006.01) |
| F04D 25/02 | (2006.01) |
| F04D 29/42 | (2006.01) |

(52) U.S. Cl.
CPC .............. *F02B 37/16* (2013.01); *F02B 39/16* (2013.01); *F02M 26/05* (2016.02); *F02M 26/06* (2016.02); *F02M 26/09* (2016.02); *F04D 25/024* (2013.01); *F04D 29/4213* (2013.01); *F04D 29/684* (2013.01); *Y02T 10/144* (2013.01)

(58) Field of Classification Search
CPC ......... F02B 37/16; F02B 39/16; F02M 26/05; F02M 26/06; F02M 26/09; F04D 25/024; F04D 29/4213; F04D 29/684; Y02T 10/144
See application file for complete search history.

(56) References Cited

U.S. PATENT DOCUMENTS

| | | | |
|---|---|---|---|
| 6,648,594 B1 * | 11/2003 | Horner ................... | F04D 25/04 415/144 |
| 6,701,710 B1 | 3/2004 | Ahrens et al. | |
| 7,021,058 B2 | 4/2006 | Scheinert | |
| 8,056,338 B2 | 11/2011 | Joergl et al. | |
| 2012/0121400 A1 | 5/2012 | Tomita et al. | |
| 2013/0266436 A1 * | 10/2013 | Ibaraki ................ | F01M 13/021 415/208.1 |

FOREIGN PATENT DOCUMENTS

JP      2013147988 A      8/2013

\* cited by examiner

*Primary Examiner* — Brandon Lee
(74) *Attorney, Agent, or Firm* — Julia Voutyras; McCoy Russell LLP

(57) ABSTRACT

Methods and systems are provided for a compressor bypass passage. In one example, a method may include flowing bypassed charge air through an annular passage into an intake passage.

9 Claims, 3 Drawing Sheets

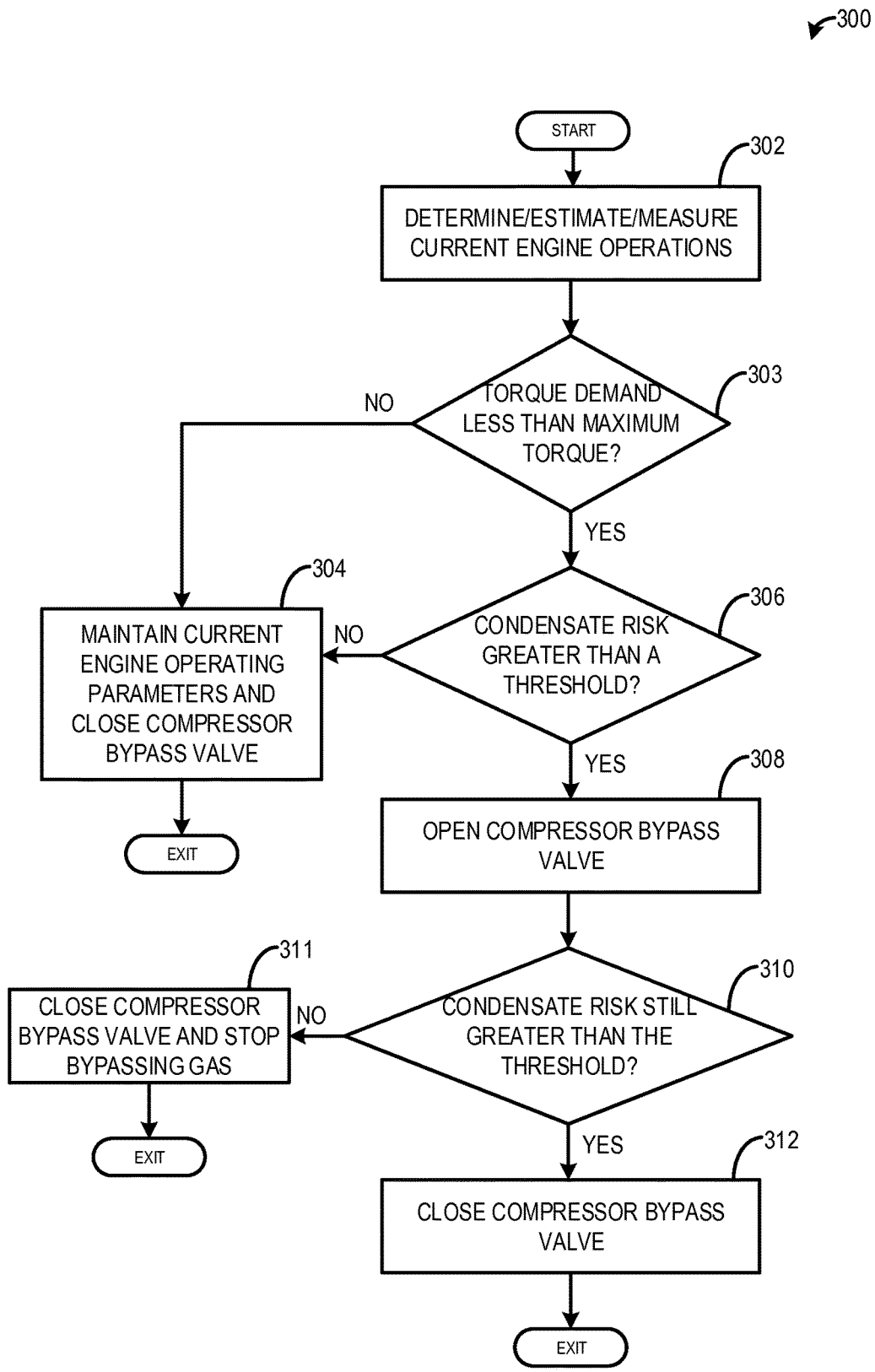

INTERNAL COMBUSTION ENGINE WITH EXHAUST-GAS TURBOCHARGING AND EXHAUST-GAS RECIRCULATION

CROSS REFERENCE TO RELATED APPLICATIONS

The present application claims priority to German Patent Application No. 102014220905.6, filed Oct. 15, 2014, the entire contents of which are hereby incorporated by reference for all purposes.

FIELD

The present description relates generally to methods and systems for bypassing intake air to upstream a compressor.

BACKGROUND/SUMMARY

It is increasingly common for engines to be equipped with both high pressure exhaust gas recirculation (HP-EGR) and low pressure exhaust gas recirculation (LP-EGR). HP-EGR redirects exhaust gas from an exhaust passage upstream of a turbine and delivers the exhaust gas to an intake passage downstream of a compressor. Alternatively, LP-EGR redirects exhaust gas from the exhaust passage downstream of the turbine and delivers the exhaust gas to the intake passage upstream of the compressor. An advantage of LP-EGR over HP-EGR may be that LP-EGR drives the turbine before being redirected to the intake passage and as a result, energy is conserved.

However, there are difficulties associated with EGR, specifically LP-EGR. For example, when LP-EGR mixes with intake air and/or components within an intake system, water may condense in the intake air forming droplets or impinge onto surfaces of the components. This is due to a higher temperature of LP-EGR and a lower temperature of the intake system and/or intake air. In this way, the temperature of the air and/or intake system surfaces may be less than a dew point temperature of water vapors within the LP-EGR. Condensate droplets may lead to increased noise and/or possibly damage to compressor blades. Furthermore, as LP-EGR increases, condensate may also increase.

Attempts to address the above described problem include condensate collectors located within an LP-EGR passage as shown in U.S. Pat. No. 8,056,338 Joergi et. al. The condensate collectors may collect vapors from the LP-EGR before it flows into an intake passage. Furthermore, the condensate collected may be directed toward a compressor wheel in order to prevent erosion.

However, the inventors herein have recognized potential issues with such systems. As one example, the condensate collector does not mitigate condensation of vapors from intake air as well. By placing the collector in the LP-EGR passage, vapors in the intake air may condense onto intake surfaces and/or form condensate droplets. The condensate collector and a passage leading from the collector to the compressor wheel may lead to packaging restraints and thus the condensate collector may not be universal to all vehicles.

In one example, the issues described above may be addressed by a method for bypassing charge air to an intake system via a compressor bypass drawing charge air upstream and downstream of a compressor impeller and able to introduce the charge air at an angle acute to an inner wall of an intake passage via an annular outlet. In this way, the bypassed charge air may create a barrier between the inner wall of the intake passage and the charge air in order to mitigate condensate impinging onto the inner wall.

As one example, when LP-EGR is flowing into the intake passage, the compressor bypass may be activated in order to decrease a likelihood of condensate formation. Additionally or alternatively, the compressor bypass may be activated based on weather conditions (e.g., humidity, rain, snow, etc.). By doing this, the compressor bypass may decrease a likelihood of condensate droplets forming onto inner walls of the intake passage while also artificially increasing a charge air quantity provided to a compressor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a method for operating the compressor bypass.

DETAILED DESCRIPTION

The following description relates to systems and methods for bypassing charge air in order to decrease condensate formation on surfaces of an intake passage. The compressor bypass may be coupled to a compressor of a turbocharger of an engine shown in FIG. 1. The engine may comprise both high pressure exhaust gas recirculation (HP-EGR) and low pressure exhaust gas recirculation (LP-EGR). The compressor bypass is located upstream of a charge air cooler and redirects charge air at an angle acute to an intake surface shown in FIG. 2. The bypass may be controlled by a control valve such that charge air is reintroduced during desired conditions and in order to both increases torque and decrease a likelihood of condensate formation. A method for operating the control valve to adjust an amount of charge air being reintroduced is shown in FIG. 3.

Figure 1:
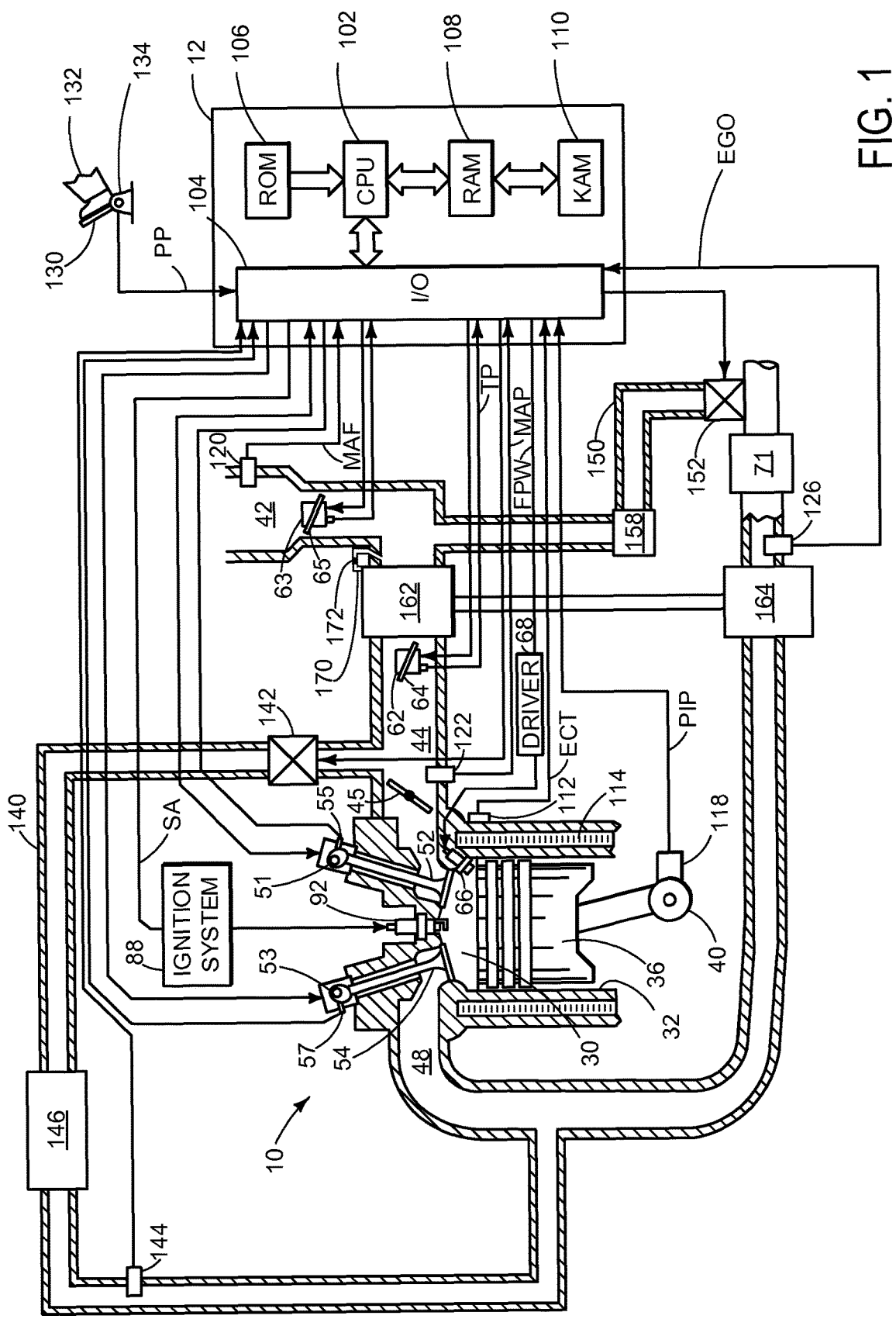
FIG. 1 shows a schematic of an engine.

Referring now to FIG. 1, a schematic diagram of one cylinder of a multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft 40. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. In some embodiments, the ignition system may include a dual spark system which includes two spark plugs per cylinder (not shown).

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Intake passage 42 may include a mass air flow sensor 120 and a manifold air pressure sensor 122 for providing respective signals MAF and MAP to controller 12. Further, intake manifold 44 may include charge motion control valve 45 for controlling the intensity of charge motion occurring in combustion chamber 30.

Further, in the disclosed embodiments, an exhaust gas recirculation (EGR) system may route a desired portion of exhaust gas from exhaust passage 48 to intake passage 44 via high-pressure EGR (HP-EGR) passage 140 and/or low-pressure EGR (LP-EGR) passage 150. The amount of EGR provided to intake passage 44 may be varied by controller 12 via HP-EGR valve 142 or LP-EGR valve 152. In some embodiments, a throttle may be included in the exhaust to assist in driving the EGR. Further, an EGR sensor 144 may be arranged within the HP-EGR passage 140 and may provide an indication of one or more of pressure, temperature, and concentration of the exhaust gas. Alternatively, the EGR (e.g., one or more of the HP-EGR and the LP-EGR) may be controlled through a calculated value based on signals from the MAF sensor (upstream), MAP (intake manifold), MAT (manifold gas temperature), and the crank speed sensor. Further, the EGR may be controlled based on an exhaust oxygen sensor and/or an intake oxygen sensor (intake manifold). Under some conditions, the EGR system may be used to regulate the temperature of the air and fuel mixture within the combustion chamber.

FIG. 1 shows HP-EGR passage 140 where EGR is routed from upstream of a turbine of a turbocharger to downstream of a compressor of a turbocharger and LP-EGR passage 150 where EGR is routed from downstream of a turbine of a turbocharger to upstream of a compressor of the turbocharger. Further, as shown in FIG. 1, the HP-EGR system may include HP-EGR cooler 146 and the LP-EGR system may include LP-EGR cooler 158 to reject heat from the EGR gasses to engine coolant, for example. In alternative embodiments, engine 10 may include only an HP-EGR system or only an LP-EGR system.

An outlet of the LP-EGR passage 150 may be spaced away from the compressor 162. A distance between the outlet and the compressor 162 may be based on a diameter of a compressor impeller. For example, the distance may be exactly 75% of the diameter of the compressor impeller. As another example, the distance may be less than or greater than 75% of the compressor impeller.

The exhaust gas recirculated by the LP-EGR passage 150 to the intake passage 42 is mixed with air upstream of the compressor 162. The mixture of air and recirculated exhaust gas produced forms a charge air which is supplied to the compressor 162 and compressed.

As such, engine 10 may further include a compression device such as a turbocharger or supercharger including at least the compressor 162 arranged along intake manifold 44. For a turbocharger, compressor 162 may be at least partially driven by a turbine 164 (e.g., via a shaft) arranged along exhaust passage 48. An exhaust gas flow may supply energy to the turbine and ultimately to the shaft for driving the compressor. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

The turbine 164 may be a radial turbine in order to allow dense packaging of the supercharging arrangement. By contrast to turbines, compressors are defined in terms of their exit flow. A radial compressor is thus a compressor whose flow exiting the rotor blades runs substantially radially. In the context of the present invention, "substantially radially" means that the speed component in the radial direction is greater than the axial speed component. The flow exiting the impeller blades of an axial compressor runs substantially axially. The compressor 162 may be radial or axial. The compressor 162 may comprise an inlet region which is coaxial to a shaft of the compressor 162 and such that the flow of charge air approaching the compressor 162 runs substantially axially.

In the case of an axial inflow to the compressor, a diversion or change in direction of the charge air flow in the intake system upstream of the at least one compressor impeller is often omitted, whereby unnecessary pressure losses in the charge air flow owing to flow diversion are avoided, and the pressure of the charge air at the inlet into the compressor is increased. The absence of a change in direction also reduces the contact of the exhaust gas and/or charge air with the internal wall of the intake system and/or with the internal wall of the compressor housing, and thus reduces the heat transfer and the formation of condensate.

The compressor 162 compresses the charge air supplied to it and delivers the compressed charge air to at least the cylinder 30. A charge air cooler may be provided in the intake manifold 44 downstream of the compressor to cool the charge air before it enter the at least one cylinder 30. The cooler lowers the temperature and thereby increases the density of the charge air, such that the charge air cooler also contributes to increased charging of the cylinder 30. The charge air is further compressed by the cooling ability of the charge air cooler.

Condensate can form if the recirculated hot exhaust gas meets and is mixed with cool air. The exhaust gas cools down, whereas the temperature of the air is increased. The temperature of the mixture of fresh air and recirculated exhaust gas (i.e., the charge-air temperature) lies below the exhaust-gas temperature of the recirculated exhaust gas. During the course of the cooling of the exhaust gas, liquids previously contained in the exhaust gas and/or in the charge air still in gaseous form, in particular water, may condense if a temperature of a component or an inner wall of the intake passage 42 is below a dew point temperature. Contaminants in the charge air may assist in the formation of condensate droplets in a charge air flow.

Condensate and condensate droplets are undesirable and may lead to increased noise emissions in the intake system, and possibly to damage of blades of the compressor 162. The latter effect is associated with a reduction in efficiency of the compressor.

A compressor bypass 170 is coupled to a portion of the compressor 162 and the intake passage 42. The compressor bypass 170 redirects a portion of charge air from within a compressor housing to upstream of the compressor. The portion of charge air (i.e., bypassed charge air) flows into the intake passage 42 at an angle acute to a surface (e.g., an inner wall) of the intake passage 42. In this way, the bypassed charge air flows adjacent to the surface and may create a barrier mitigating a likelihood of condensate impinging onto the surface. Bypassed charge air flows back toward to compressor 162.

The compressor bypass line 170 may serve to recirculate charge air into the intake passage 42 upstream of the compressor 162, in order to artificially increase a charge air quantity fed to the compressor. In this way, a lag line can be shifted in a compressor characteristic diagram toward smaller compressor flows, as a result of which higher charge pressure ratios can be achieved even in the case of small compressor flows. A torque characteristic in the lower rotational speed range is improved considerably as a result.

Supercharging may be used for increasing the power of an internal combustion engine while maintaining a mass air flow, or for reducing the mass air flow while maintaining the same power. In any case, supercharging leads to an increase in volumetric power output and an improved power-to-weight ratio. If the mass air flow is reduced, it is thus possible to shift the engine load toward higher loads, at which the specific fuel consumption is lower.

A bypass valve 172 may adjust a flow of bypassed charge air through the compressor bypass line 170. The bypass valve 172 may move to a more open position to allow more charge air to bypass the compressor 162. The compressor bypass 170 and a method for controlling the bypass valve 172 will be discussed in further detail below with respect to FIGS. 2 and 3.

Exhaust gas sensor 126 is shown coupled to exhaust passage 48 upstream of emission control system 70 and downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_X$, HC, or CO sensor.

Emission control device 71 is shown arranged along exhaust passage 48 downstream of exhaust gas sensor 126. Emission control device 71 may be a selective catalytic reduction (SCR) system, three way catalyst (TWC), $NO_X$ trap, various other emission control devices, or combinations thereof. For example, device 71 may be a TWC. Further, in some embodiments, during operation of engine 10, emission control device 71 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed. The controller 12 receives signals from the various sensors of FIG. 1 and employs the various actuators of FIG. 1 to adjust engine operation based on the received signals and instructions stored on a memory of the controller.

As described above, FIG. 1 shows only one cylinder of a multi-cylinder engine, and each cylinder may similarly include its own set of intake/exhaust valves, fuel injector, spark plug, etc. The engine further comprises a turbocharger with a compressor and a turbine. A compressor bypass is used to bypass a portion of charge air to upstream a compressor to decrease a likelihood of condensate formation, as will be described below with respect to FIG. 2.

Figure 2:
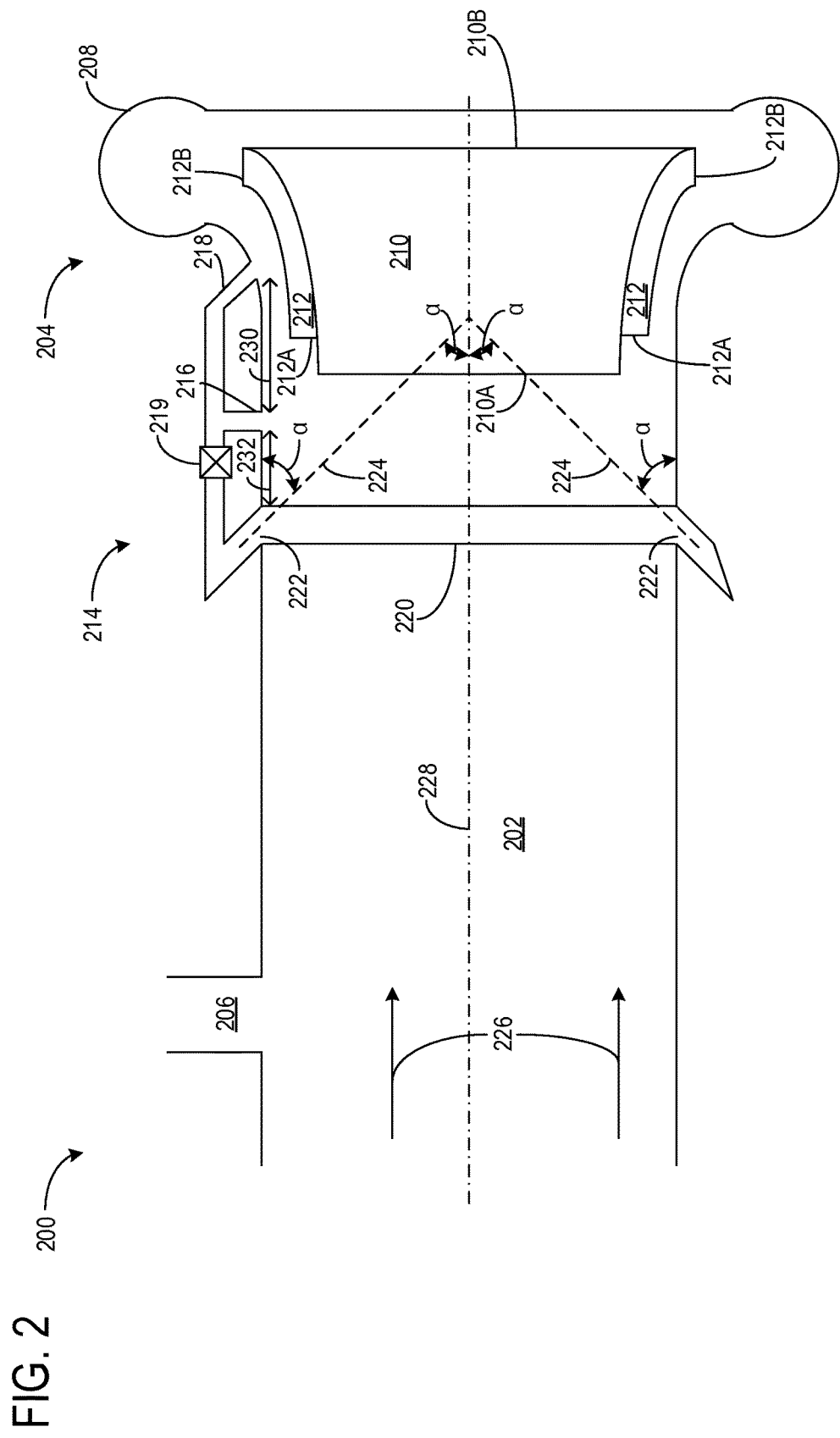
FIG. 2 shows a compressor bypass and an angle of charge air reintroduction

Turning now to FIG. 2, a system 200 comprising an intake passage 202 leading to a compressor 204 is shown. Intake passage 202, compressor 204, and LP-EGR passage 206 may be used similarly to intake passage 42, compressor 162, and LP-EGR passage 150 in the embodiment of FIG. 1. Arrows 226 may depict a direction of gas flow through the system 200.

Intake air may be conducted through the intake passage 202 toward the compressor 204. LP-EGR may flow into the intake passage 202 via the LP-EGR passage 206, upstream of the compressor 204, and mix with intake air prior to reaching the compressor 204. The mixture of intake air and the LP-EGR may herein be referred to as charge air. The LP-EGR may be composed of exhaust gas, fuel vapors, water vapors, air, $CO_2$, $NO_X$, and other combustion by-products. The charge air is greater in temperature than the intake air and lower in temperature than the LP-EGR.

The charge air may flow into the compressor 204, which comprises a compressor housing 208. The compressor housing 208 may be a spiral or worm housing, wherein a diversion of the charge-air flow in the compressor 204 can be utilized for conducting the compressed charge air on a shortest path from an outlet side, on which the turbine of the exhaust-gas turbocharger is commonly arranged, to an inlet side. An impeller 210 with blades 212 may compress a volume of charge air from a first, lower pressure to a second, greater pressure. Thus, a density of charge air is increased, which may result in an increased power output for a corresponding engine.

As described above, the compressor 204 may further comprise a compressor bypass 214. Although not depicted as such, the compressor bypass 214 may be housed within the compressor housing 208. The compressor bypass 214 comprises two junctions in fluid communication with the intake passage 202 and the compressor 204. A first junction 216 intercepts a first portion of charge air upstream of the impeller 210. A second junction 218 intercepts a second portion of gas downstream of the impeller 210. Charge air flowing through the second junction 218 is greater in pressure than gas flowing through the first junction 216. The first portion of charge air may be less than, equal to, or greater than the second portion of charge air. It will be appreciated by someone skilled in the art that the compressor bypass 214 may have three or more junctions for redirecting the charge air. As an alternative, however, each junction can also have a separate passage such that charge air in a first junction does not mix with charge air from a second junction. Furthermore, each junction may have a bypass valve such that a first junction may be operated independently of a second junction.

When a compressor bypass valve 219 is open, gas flowing through the first junction 216 and the second junction 218 may flow into an annular passage 220. The compressor bypass valve 219 is located in a passage coupled to both the first junction 216 and the second junction 218. Annular passage 220 surrounds a circumference of a pipe of the intake passage 202. The annular passage 220 may be a cavity, channel, or passage resulting from a natural geometry of the intake passage 202. The annular passage 220 is open to the intake passage 202 via an annular outlet 222 located proximal to and upstream of the compressor 204. The annular outlet 222 is located between the LP-EGR passage 206 and the compressor 204. Charge air flowing from the first junction 216 and the second junction 218 may flow through the annular passage 220 and into the intake passage 202 via outlet 222. The outlet 222 is a single opening traversing an entire circumference of the pipe of the intake passage 202, allowing bypassed charge air to flow proximally to an inner wall of the pipe of the intake passage 202.

Dashed lines 224 show a direction of bypassed charge air flow from the outlet 222 into the intake passage 202. Angle a shows an angle between the bypassed charge air flow direction from the outlet 222 and the pipe of the intake passage 202. As shown, the angle a is acute and as a result, the bypassed charge air flowing from the outlet 222 is proximal to the pipe of the intake passage 202. The outlet 222 opening into the intake passage 202 leads along the pipe (e.g., an inner wall) of the intake system and is directed to the impeller 210.

As described above, the second junction 218 receives charge air from downstream of the impeller 210. Therefore, bypassed charge air flowing through the outlet 222 is greater in pressure and temperature than charge air flowing through the intake passage 202 upstream of the compressor bypass 214. In this way, charge air may not flow from the intake passage 202 and into the outlet 222. The bypassed gas flows between the pipe and the charge air of the intake passage 202 forming an annular barrier, which may decrease a likelihood of condensate formation. The bypassed charge air may also increase a temperature of the pipe, further decreasing the likelihood of condensate formation. With the decrease of the likelihood of condensate formation, noise emissions owing to condensation droplets are also decreased. The risk of damage to the blades 212 of the at least one compressor impeller 210 is decreased. The efficiency of the compressor 204 may be increased, or remain uninfluenced by the LP-EGR.

FIG. 2 depicts a compressor bypass with a valve for activating and deactivating the compressor bypass. FIG. 3 depicts a method for operating the valve.

Turning now to FIG. 3, a method 300 for controlling a compressor bypass valve is depicted. Instructions for carrying out method 300 may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. Specifically, method 300 may refer to engine 10, LP-EGR passage 150, compressor 204, compressor bypass 214, first junction 216, second junction 218, compressor bypass valve 219, and annular passage 220.

The method 300 begins at 302, the method 300 includes determining, estimating, and/or measuring current engine operating parameters. The engine operating parameters may include one or more of engine load, engine speed, manifold vacuum, EGR flow rate, engine temperature, intake air temperature, intake air humidity, and air/fuel ratio. The method 300 may further determine current weather conditions (e.g., rain, snow, humidity, etc.).

At 303, the method 300 includes determining if a current torque demand is less than a maximum torque demand. The torque demand may be based on a pedal position and/or a throttle position. A more depressed pedal position (e.g., closer to a vehicle floor) may correspond to a higher torque demand. A more open throttle position may correspond to a higher torque demand.

If the method 300 determines that the torque demand is not less than the maximum torque demand, then the method may proceed to 304 to maintain current engine operating parameters and to close the compressor bypass valve in order to allow all of charge air to flow through a compressor and into one or more cylinders of an engine without flowing through the compressor bypass. Herein, charge air flowing through the compressor bypass may be referred to as bypassed charge air. In some embodiments, determining a value of the torque demand may be omitted from the method 300.

If the method 300 determines that the torque demand is less than the maximum torque demand, then the method may proceed to 306. At 306, the method 300 includes determining if a condensate risk is greater than a threshold. The condensate risk may be based on an LP-EGR flow rate, engine temperature, cold-start, and current weather conditions. For example, as the LP-EGR flow rate increases, the condensate risk also increases. As the engine temperature decreases, the condensate risk increases. For example, if the engine is operating at a cold-start condition, the condensate risk is increased. Increased intake air humidity may increase the condensate risk. Additionally, weather conditions (e.g., rain, humidity, and snow) may increase the condensate risk, while other weather conditions (e.g., high temperature, low humidity, and wind) may decrease the condensate risk.

If the condensate risk is not greater than the threshold, then the method 300 proceeds to 304 to maintain a current engine operation and adjust a compressor bypass valve to the closed position, as described above.

If the condensate risk is greater than the threshold, then the method 300 proceeds to 308 to open the compressor bypass valve in order to redirect charge air from the compressor via the first and second junctions to the annular passage. The bypassed charge air flows out the annular passage acute to interior surfaces of the intake passage. The bypassed charge air creates a barrier between the interior surfaces of the pipe and the charge air in the intake passage in order to mitigate condensate formation on the interior surfaces. The bypassed charge air also increased a temperature of the interior surfaces, further decreasing condensate formation.

At 310, the method 300 determines if the condensate risk is still greater than the threshold. If the condensate risk is not greater than the threshold, then the method 300 may proceed to 311 to close a compressor bypass valve and stop bypassing charge air. The condensate risk may fall below the threshold if LP-EGR is decreased or disabled, if the engine temperature increases, if intake air humidity decreases and/or if a weather condition becomes more dry and/or hotter. No charge air is bypassed when the compressor bypass valve is in a closed position.

If the condensate risk is still greater than the threshold, then the method 300 proceeds to 312 to maintain the compressor bypass valve in an open position and to continue monitoring the condensate risk. The compressor bypass valve is kept open until the condensate risk is no longer greater than the threshold or until a maximum torque is demanded.

In one embodiment, the compressor bypass valve may be a variable valve, where the valve may be adjusted to a more open or a more closed position based on a value of the condensate risk. For example, for a first condensate risk greater than the threshold, the valve may be moved to a more open position to allow more bypassed gas to flow through the annular passage. Alternatively, for a second condensate risk slightly greater than the threshold and less than the first condensate risk, the valve may be moved to a more closed position to allow less bypass air to flow through the annular passage than in the first condensate risk. The more closed position being compared to the valve position of the valve at the first condensate risk.

In this way, an amount of condensate being swept into the compressor is decreased. More specifically, a likelihood of forming large condensate droplets is decreased by bypassing charge air through the compressor bypass and flowing the bypassed charge air back into the intake passage. The bypassed charge air flows back into the intake passage in a ring-shape and creates a barrier between interior surfaces of the intake passage and charge air flowing through the intake passage. Thus, the bypassed charge air may decrease contact between the interior surfaces and the charge air in the intake passage while also heating the interior surfaces to further decrease a likelihood of condensate formation. The technical effect of bypassing charge air to upstream of the compressor is to decrease condensate formation on interior surfaces of an intake passage and to decrease condensate droplet formation in the intake passage. Thus, a compressor efficiency may be maintained or increased.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

In an example embodiment, a method of operating the engine includes bypassing charge air to an intake system via a compressor bypass drawing charge air from each of upstream and downstream of a front face of a compressor impeller via first and second passage openings, where the compressor bypass introduces the bypassed charge air at an angle acute to an inner wall of an intake passage via an annular outlet of the passage. The air drawn in from each of the openings may be controlled via a single valve during operation of the engine and responsive to operating conditions. The charge air may include fresh air and exhaust gas, such as from LP EGR. The flow of charge exiting the annular outlet may form a region of higher velocity flow that may form a layer to redirect the remainder of the charge flowing through the intake passage away from the inner walls of the intake passage to reduce the potential for condensation at the walls. The layer, or blanket, of faster moving charge at the angle of the annular opening may thus be at an angle relative to the central axis of the intake passage in one example. The air may thus act as a blade.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    bypassing charge air to an intake system via a compressor bypass from each of upstream and downstream of a compressor impelled;
    flowing the bypassed charge air from the compressor bypass to an intake passage at an angle acute to an inner wall of the intake passage via an annular outlet downstream of a low-pressure exhaust gas recirculation passage relative to a central axis of the intake passage;
    not flowing the bypassed charge air through the annular outlet when a compressor bypass valve, located in the compressor bypass, is in a closed position; and
    opening the compressor bypass valve in response to a condensate risk, the condensate risk based on a low-pressure exhaust gas recirculation flow, engine temperature, intake air temperature, intake air humidity, and weather conditions,
    wherein bypassing charge air includes drawing charge air from upstream of the compressor impeller and downstream of the compressor impeller.

2. The method of claim 1, further comprising flowing the bypassed charge air near the inner wall and transferring heat between the bypassed charge air and the inner wall.

3. The method of claim 1, wherein the bypassed charge air bypasses a portion of uncompressed charge air and compressed charge air.

4. The method of claim 1, wherein the bypassed charge air flows between the low-pressure exhaust gas recirculation passage and a compressor.

5. A compressor bypass located between a compressor and a low-pressure EGR passage relative to a central axis of an intake passage, where the low-pressure EGR passage is directly coupled to a portion of the intake passage upstream of the compressor, the compressor bypass comprising:
    a first junction located upstream of a compressor impeller;
    a second junction located downstream of the first junction and the compressor impeller;
    a bypass passage in fluid communication with the first junction and the second junction, wherein a control valve in the bypass passage is located upstream of the first junction;
    an annular passage in fluid communication with the bypass passage and the intake passage, wherein the annular passage directs bypassed charge air into the intake passage in a circular direction adjacent an inner wall of the intake passage toward the compressor; and
    a controller configured to open the control valve in response to a condensate risk, the condensate risk based on a low-pressure exhaust gas recirculation flow, engine temperature, intake air temperature, intake air humidity, and weather conditions,
    wherein when the control valve is in a closed position the bypassed charge air does not flow through the annular passage,
    wherein the annular passage comprises a single circular opening to the intake passage,
    wherein the circular opening is oblique to the inner wall of the intake passage, and
    wherein an angle between the inner wall and a direction of the bypassed charge air flow is acute.

6. The system of claim 5, wherein the first junction directs uncompressed charge air to the bypass passage and the second junction directs compressed charge air to the bypass passage.

7. The system of claim 5, wherein the bypassed charge air is greater in pressure and temperature than charge air in the intake passage.

8. The system of claim 5, wherein the bypassed charge air flows toward the compressor impeller.

9. The system of claim 5, wherein the bypassed charge air flows between the inner wall and the charge air.

* * * * *